United States Patent Office.

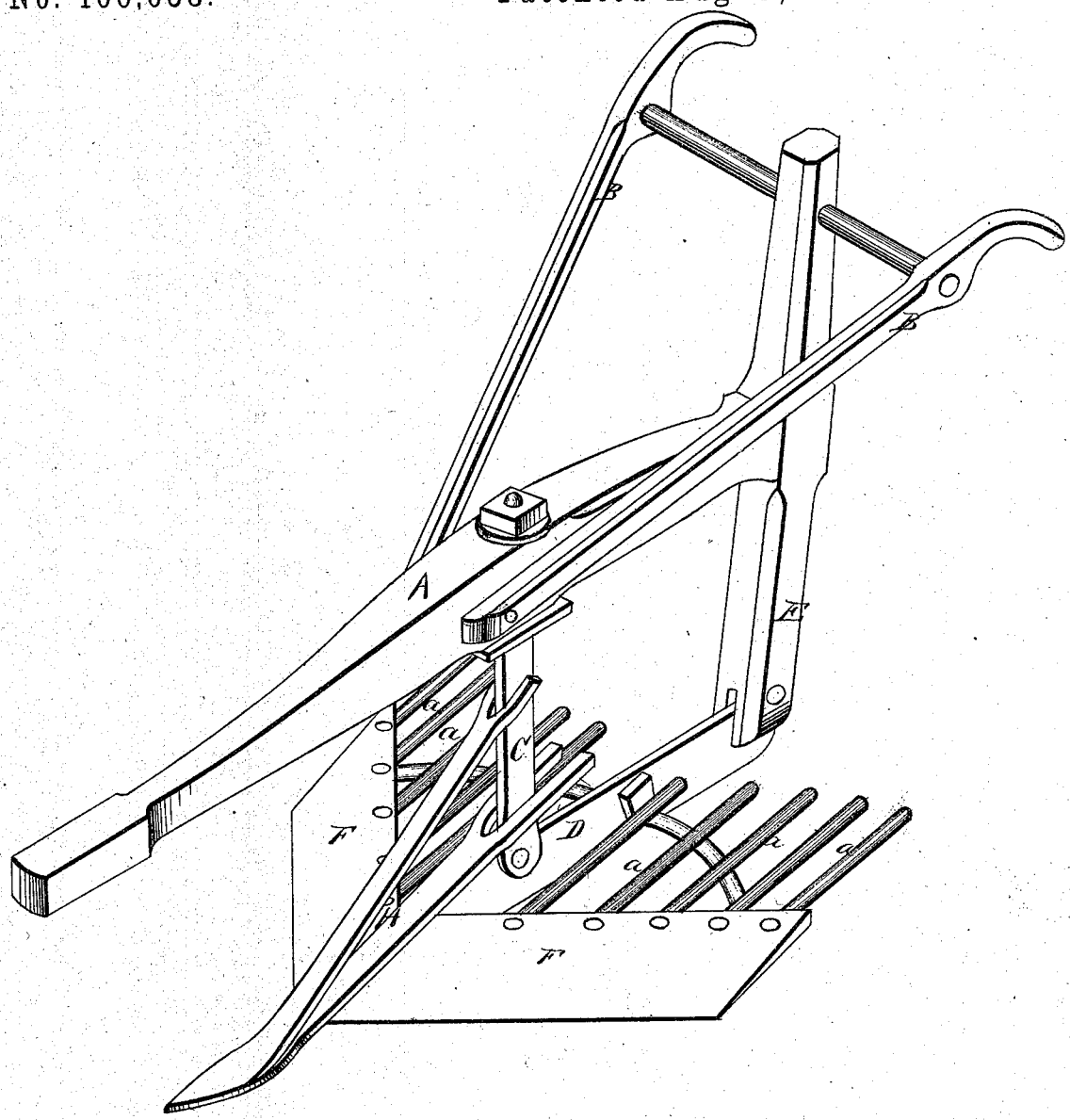

URIAH R. HARLOW, OF FARMERSVILLE, CALIFORNIA.

Letters Patent No. 106,058, dated August 2, 1870.

IMPROVEMENT IN POTATO-DIGGERS.

The Schedule referred to in these Letters Patent and making part of the same

*To all whom it may concern:*

Be it known that I, URIAH R. HARLOW, of Farmersville, county of Tulare, State of California, have invented an Improved Potato-Digger; and I do hereby declare the following description and accompanying drawing are sufficient to enable any person skilled in the art or science to which it most nearly appertains to make and use my said invention or improvements, without further invention or experiment.

My invention relates to an improved machine for unearthing potatoes and leaving them upon the surface of the ground, so that they may be readily picked up, and consists in providing a guard or bar, to project in front and above the operating parts of the digger, so as to clear away the potato-vines, weeds, or other matter that might otherwise clog the machine, or be carried over the upper end of the fingers and fall into the furrow made by the plow.

In order to more fully illustrate and explain my invention, reference is had to the accompanying drawing forming a part of this specification, in which—

A represents the beam, and

B B the handles, which are made similar to those employed in an ordinary single plow.

The standard C corresponds to the standard by which plows are connected with the plow-beam in the ordinary plow.

The lower end of this standard is secured to the metal or other central bar D.

This central bar is about the same length as the beam A, being secured at its rear end to the upright E, and its front end being pointed, as shown.

Upon each side of this center bar, and at the most suitable point, are secured mold-boards F, the two forming wings, which stand at the desired angle for cutting beneath the potato rows.

The mold-boards may be made of any desired shape, either curved or straight, and attached to the center bar, so as to stand at an incline similar to the mold-boards of a plow.

Along the upper edge of these mold-boards are arranged long teeth or fingers, *a a a*, which also stand at an inclination in the same direction as the mold-boards.

These fingers are placed far enough apart to permit the dirt which is raised with the potaoes to pass through and fall in the rear of the mold-board, but to prevent the potatoes themselves from passing through, and, as a consequence, they will roll down the inclined mold-board upon the ground, or be carried over their upper ends and fall to the rear in the furrow.

A guard or bar, H, is secured to the front end of the center bar D, just back of the point, and extends back to the standard C, to which its opposite end is fastened, the guard standing at an inclination or angle sufficient to raise and carry over the mold-boards any weeds or potato-tops which come in the way, and thus prevent clogging the operation of the machine.

With this device, potatoes can be unearthed and left upon the surface of the ground in a convenient condition for being picked up, and that with the same ease that furrows are made in plowing.

Having thus described my invention,

What I claim, and desire to secure by Letters Patent, is—

The inclined guard-bar H, for preventing clogging, substantially as herein specified.

In witness whereof I have hereunto set my hand and seal.

URIAH R. HARLOW. [L. S.]

Witnesses:
THOS. W. BROWN,
GEO. E. BROWN.